(12) United States Patent
Bather et al.

(10) Patent No.: US 10,663,275 B2
(45) Date of Patent: May 26, 2020

(54) METHOD OF MANUFACTURING AND INSPECTING GAS WASHED COMPONENTS IN A GAS TURBINE ENGINE

(71) Applicant: ROLLS-ROYCE plc, London (GB)

(72) Inventors: Simon Bather, Derby (GB); Giulio Zamboni, Derby (GB)

(73) Assignee: ROLLS-ROYCE plc, London (GB)

( * ) Notice: Subject to any disclaimer, the term of this patent is extended or adjusted under 35 U.S.C. 154(b) by 218 days.

(21) Appl. No.: 15/611,198

(22) Filed: Jun. 1, 2017

(65) Prior Publication Data
US 2018/0120079 A1 May 3, 2018

(30) Foreign Application Priority Data
Jun. 6, 2016 (GB) .................................. 1609858.4

(51) Int. Cl.
*G01B 5/20* (2006.01)
*G05B 19/4099* (2006.01)
(Continued)

(52) U.S. Cl.
CPC ............. *G01B 5/205* (2013.01); *G01B 5/008* (2013.01); *G01B 11/24* (2013.01);
(Continued)

(58) Field of Classification Search
None
See application file for complete search history.

(56) References Cited

U.S. PATENT DOCUMENTS

| | | | |
|---|---|---|---|
| 8,718,975 B2 * | 5/2014 | Lobato | G01B 21/04 702/167 |
| 2006/0020432 A1 * | 1/2006 | Gower | G06F 17/50 703/1 |

(Continued)

FOREIGN PATENT DOCUMENTS

| | | |
|---|---|---|
| DE | 102013226422 B3 | 2/2015 |
| EP | 1615153 A2 | 1/2006 |

(Continued)

OTHER PUBLICATIONS

Grossmann David et al., DE 102013226422 B3, IDS record, translation (Year: 2015).*

(Continued)

*Primary Examiner* — Lina M Cordero
(74) *Attorney, Agent, or Firm* — Oliff PLC

(57) ABSTRACT

Producing a component having an in use gas washed surface includes: obtaining a reference component having a reference shape with an in use gas washed surface; setting one or more performance threshold for the reference shape, the threshold defining an acceptable performance for the reference shape; obtaining a manufactured component made to the reference shape; measuring the manufactured component and determining a displacement distribution indicative of the geometric deviation of the manufactured component from the reference shape; determining a performance sensitivity distribution for the reference component, the sensitivity distribution having a plurality of points, each point indicative of a performance factor for the reference component; combining the sensitivity distribution and displacement distribution to determine a performance prediction for the manufactured component; determining whether the performance prediction is within the performance threshold; accepting or rejecting the component for use if the predicted (Continued)

performance is within or outside the performance threshold, respectively.

19 Claims, 10 Drawing Sheets

(51) Int. Cl.
*G05B 19/42* (2006.01)
*G01B 5/008* (2006.01)
*G01B 11/24* (2006.01)
*G01N 21/95* (2006.01)
*G05B 19/4093* (2006.01)
*F01D 5/12* (2006.01)
*F01D 9/02* (2006.01)
*G01M 15/14* (2006.01)

(52) U.S. Cl.
CPC ..... *G01N 21/9515* (2013.01); *G05B 19/4099* (2013.01); *G05B 19/40931* (2013.01); *G05B 19/4207* (2013.01); *F01D 5/12* (2013.01); *F01D 9/02* (2013.01); *F05D 2220/32* (2013.01); *F05D 2260/83* (2013.01); *G01M 15/14* (2013.01); *G05B 2219/35128* (2013.01); *G05B 2219/35162* (2013.01); *G05B 2219/37205* (2013.01); *G05B 2219/37617* (2013.01); *G05B 2219/45147* (2013.01)

(56) References Cited

U.S. PATENT DOCUMENTS

| | | |
|---|---|---|
| 2007/0025855 A1 | 2/2007 | Bouron et al. |
| 2009/0306930 A1* | 12/2009 | Cameron ............... F01D 5/141 702/167 |
| 2013/0026147 A1* | 1/2013 | Care ....................... F01D 5/286 219/121.85 |
| 2013/0195641 A1* | 8/2013 | Povey ..................... F01D 5/143 415/208.2 |
| 2013/0238109 A1* | 9/2013 | Romanelli ........... G05B 19/401 700/97 |
| 2014/0059856 A1* | 3/2014 | Simmons ............. G05B 19/404 29/889.7 |
| 2014/0257543 A1* | 9/2014 | Rhodes .............. G05B 19/4097 700/97 |
| 2014/0373503 A1* | 12/2014 | Hanlon ................ G05B 19/401 60/39.01 |

FOREIGN PATENT DOCUMENTS

| | | |
|---|---|---|
| EP | 2857914 A1 | 4/2015 |
| EP | 3009903 A1 | 4/2016 |

OTHER PUBLICATIONS

Oct. 19, 2017 Search Report issued in European Patent Application No. 17173992.3.
Nov. 10, 2016 Search Report issued in British Patent Application No. 1609860.0.
Nov. 4, 2016 Search Report issued in British Patent Application No. 1609858.4.
U.S. Appl. No. 15/611,162, filed Jun. 1, 2017 in the name of Bather et al.
Jul. 2, 2019 Office Action issued in U.S. Appl. No. 15/611,162.

* cited by examiner

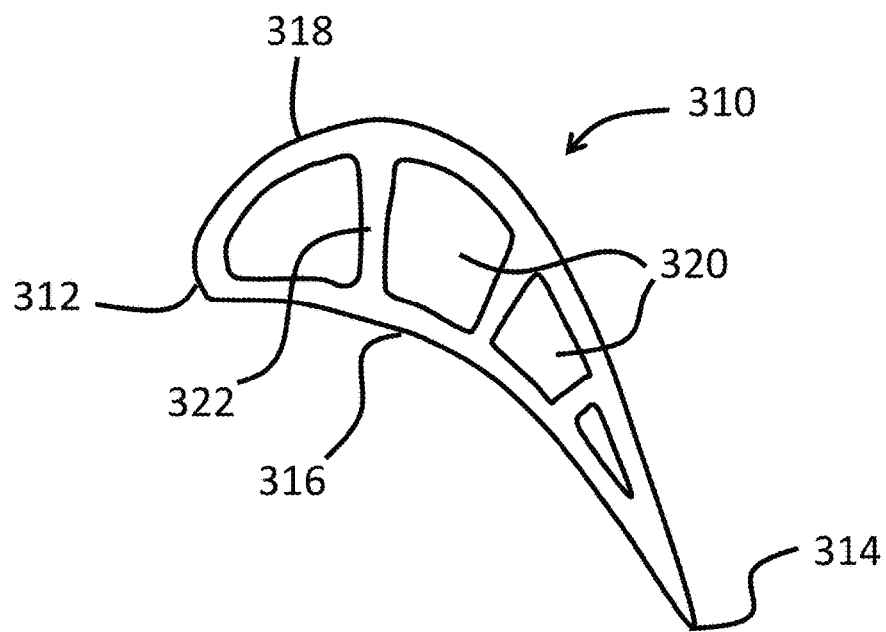
Fig. 3
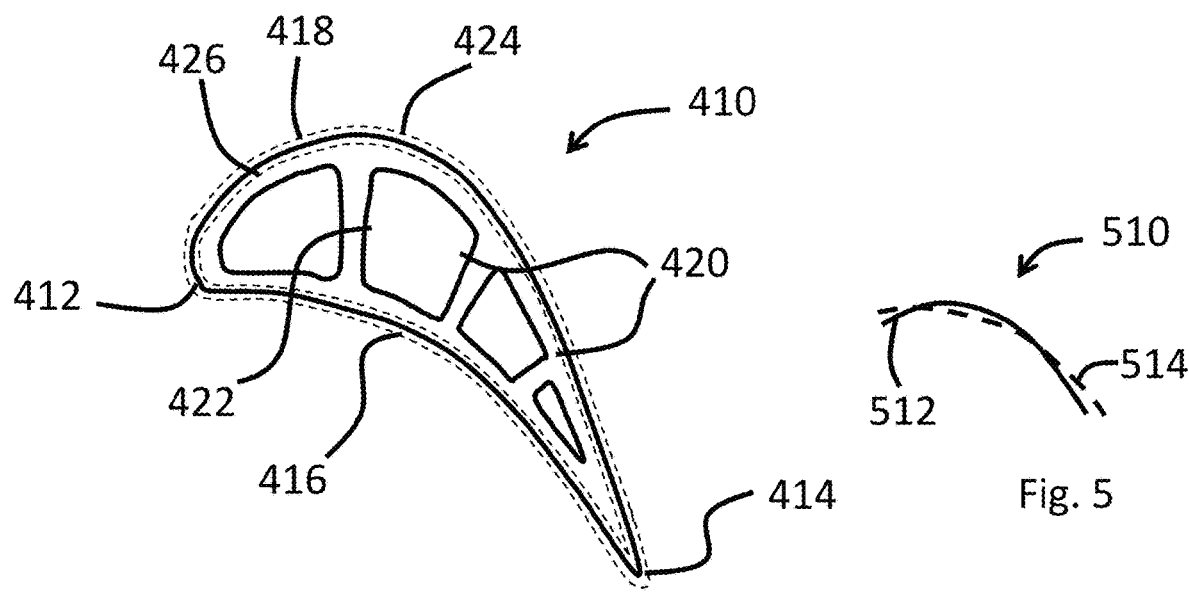
Fig. 4
Fig. 5

METHOD OF MANUFACTURING AND INSPECTING GAS WASHED COMPONENTS IN A GAS TURBINE ENGINE

TECHNOLOGICAL FIELD

The present disclosure concerns a method of manufacturing and inspecting manufactured gas washed components for a gas turbine engine. In particular, the invention relates to aerofoil portions of blades and vanes.

BACKGROUND

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Other gas turbine engines are known in the art. Such engines may have an alternative number of interconnecting shafts (e.g. two) and/or an alternative number of compressors and/or turbines. Further the engine may comprise a gearbox provided in the drive train from a turbine to a compressor and/or fan.

The turbines and compressors each include a series of stages arranged in axial flow series. In the case of a turbine, each stage consists of an annular arrangement or row of nozzle guide vanes, followed by a row of rotating turbine blades. FIG. 2 shows an isometric view of a circumferential portion of a typical single stage cooled turbine. The nozzle guide vanes are static components mounted to the engine casing and comprise an aerofoil portion 31, and radially inner and outer platforms 33. The nozzle guide vanes are shaped to swirl the gas flow in the direction of the turbine blade rotation to provide an optimum angle of incidence on the turbine blades and increase the tangential momentum of the gas flow.

The turbine blade rotor includes a plurality of blades peripherally mounted to a rotor disc which is rotatable about the principal axis of the gas turbine engine. Each blade includes a radially inner platform 34 and an aerofoil portion 32. In the arrangement shown, the blade is a shrouded blade meaning an outer platform or shroud is mounted to the radial tip of the blades, the shrouds of adjacent blades abutting one another to provide a full annulus on the radially outer of the gas path. A static seal segment 35 is located radially outside of the shroud with the two components acting in concert to provide an air seal and a preferential air path between the blades, rather than over them.

The turbine blades translate the circumferential flow leaving the nozzle guide vanes into rotation of the disc. The adjacent aerofoil portions of the blades define a gas path passage which provides steady acceleration of the flow up to the smallest flow area known as the throat. As will be appreciated, the turbine vanes and blades, particularly the earlier stages, are required to operate in an extremely hot environment with the rotational speeds on the blades creating significant centrifugal loading. Ensuring that the vanes and blades have the necessary aerodynamic performance, efficiency, cost, life and weight makes the turbine blades and vanes one of the most technically challenging areas of the gas turbine engine.

The transverse cross section of the blade and vanes are governed by the aerodynamic properties, the permitted stress, material and cooling passages located within the blade. FIG. 3 shows a generic transverse schematic section of an aerofoil portion 310 which may be that of a turbine blade or nozzle guide vane. The aerofoil 310 includes a leading edge 312 and a trailing edge 314 with pressure 316 and suction 318 surfaces extending therebetween. The axial dimension of the aerofoil is commonly referred to as the chord, whilst the radial length of the aerofoil, the span.

The pressure 316 and suction 318 surfaces are provided by respective pressure and suction walls. The interior of the aerofoil includes cooling passages 320 which are defined by the pressure and suction walls and webs which extend therebetween. The cooling air passages deliver air to the interior and exterior surfaces of the aerofoil. The exterior cooling is achieved via various cooling hole arrangements such as the film cooling holes shown in FIG. 2. As will be appreciated, the specific internal architecture and external shape of a vane or blade will be specific to a given engine and may vary considerably from those shown in FIGS. 2 and 3.

The nozzle guide vanes and turbine blades of current state of the art turbines are generally made by investment casting which allow for the integral formation of the internal cooling passages 320. Once cast, the blades undergo a number of processes to, for example, provide cooling holes, thermal barrier coatings and removal of extraneous materials and features which result from the casting process.

Despite careful control measures, the number and complex nature of the manufacturing steps can lead to considerable variation in the final components which can affect blade performance and lifting. Consequently, the blades are assessed at various stages of production and non-conforming parts are recycled or scrapped.

One criteria for assessing cast components is aerofoil shape and wall thickness which are typically measured and compared to a reference shape. Due to the highly specific and complex geometry of the aerofoils, the number of variations in the geometric shape and wall thickness of manufactured parts can vary tremendously and determining what is and is not acceptable is often difficult to assess on a case by case basis.

The present invention seeks to provide a method of producing gas turbine blades which have an improved performance consistency.

Although the introduction and following description is focussed predominantly of turbine aerofoils, namely those of vanes and blades, it is to be noted that the invention is applicable to any aerofoil or impeller or end wall thereof. Hence, the invention may be applied to compressors, propellers, turbines, fans etc. Further, the invention may find use in any component having a gas washed surface, such as a wing of an aircraft, an engine nacelle, or the shape of a marine impeller.

BRIEF SUMMARY

The present invention provides a method of producing a component having an in use gas washed surface as recited in the appended claims.

Herein described is a method of producing a component having an in use gas washed surface, comprising: obtaining a reference component having a reference shape with an in use gas washed surface; setting one or more performance threshold for the reference shape, the one or more performance threshold defining an acceptable performance for the reference shape; obtaining a manufactured component made to the reference shape; measuring the manufactured component and determining a displacement distribution indicative of the geometric deviation of the manufactured component from the reference shape; determining a performance sensitivity distribution for the reference component, the performance sensitivity distribution having a plurality of points, each point indicative of a performance factor for the reference component; combining the performance sensitivity distribution and displacement distribution to determine a performance prediction for the manufactured component; determining whether the performance prediction is within the performance threshold; accepting the component for use if the predicted performance is within the performance threshold; rejecting the component if the predicted performance is outside the performance threshold.

The method may further comprise: setting one or more geometric threshold for the reference shape, the one or more geometric threshold being indicative of an acceptable geometric variance from the reference shape;

prior to step g), determining whether the displacement distribution includes one or more areas outside of the one or more geometric threshold;

if the displacement distribution includes one or more areas outside of the geometric threshold carrying out step g), or accepting the part for use if the displacement distribution is within the one or more geometric threshold.

The performance factor for a performance objective F_i may be given by:

$$F_i(\vec{x}) = \frac{d\, Objective_i(\vec{x})}{d\vec{x}}$$

in which $\vec{x}$ is the spatial vector position of a surface relative to the reference component surface.

The performance factor may be one or more from the group comprising: aerodynamic efficiency, isentropic efficiency, polytrophic efficiency, flow level, flow capacity, pressure ratio, specific work, degree of reaction and aerodynamic loss of the component.

The combination of the performance sensitivity distribution and the displacement distribution may be given by:

$$\Delta F_i = \sum_{j=1}^{N_{points}} F_i(\vec{x}_j) \cdot \Delta \vec{n}(\vec{x}_j), \text{ or;}$$

$$\Delta F_i = \int_{Surface} F_i(\vec{x}_j) \cdot \Delta \vec{n}(\vec{x}_j)\, dA$$

in which $\Delta F\_i$ is the effect on performance $F\_i$ of the spatial geometry of the component, $\Delta \vec{n}(\vec{x}\_j)$ is the displacement distribution and $N\_points$ is the number of points analysed on the component.

The one or more geometric thresholds may be defined by an upper and a lower limit. The one or more geometric threshold may be provided at a constant distance around the component. The reference component may include a plurality of zones, each zone having a difference geometric threshold.

The geometric threshold in each zone may be determined in relation to a performance sensitivity for the reference component at each zone.

Measuring the manufactured component and determining a displacement distribution indicative of the geometric deviation of the manufactured component from the reference shape may include taking discrete measurements of geometric displacements at predetermined locations on the component in which the predetermined locations correspond to the points at which the performance sensitivity distribution is calculated.

Measuring the manufactured component may include measuring a surface of a component using a coordinate measuring machine.

The measuring of the sample set may include scanning the component with an optical scanner.

The method may further comprise obtaining a plurality of manufactured components; determining the performance prediction for each of the manufactured components; statistically averaging the performance predictions for the manufactured components; wherein determining whether the performance prediction is within the performance threshold is done using the statistically averaged performance prediction.

The component may include an aerofoil portion. The aerofoil portion may form part of a turbine blade or turbine vane.

The at least one of the zones may include the leading edge, trailing edge or suction surface mid-chord region.

Also described is a computer program that, when read by a computer, causes performance of the method, and a non-transitory computer readable storage medium comprising computer readable instructions that, when read by a computer, cause performance of the method.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 3 illustrates a transverse section of a gas turbine blade showing internal radially extending cooling passages;

FIG. 4 illustrates a transverse section of a gas turbine aerofoil showing external and internal threshold limits for the aerofoil external wall.

FIG. 5 illustrates a portion of aerofoil external wall and a breach of the predetermined threshold limit.

DETAILED DESCRIPTION

Figure 1:
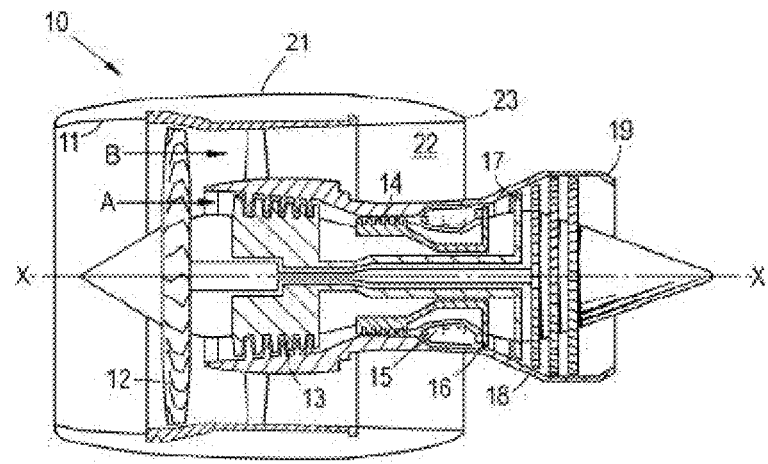
FIG. 1 illustrates a cross sectional side view of a gas turbine engine.
Figure 2:
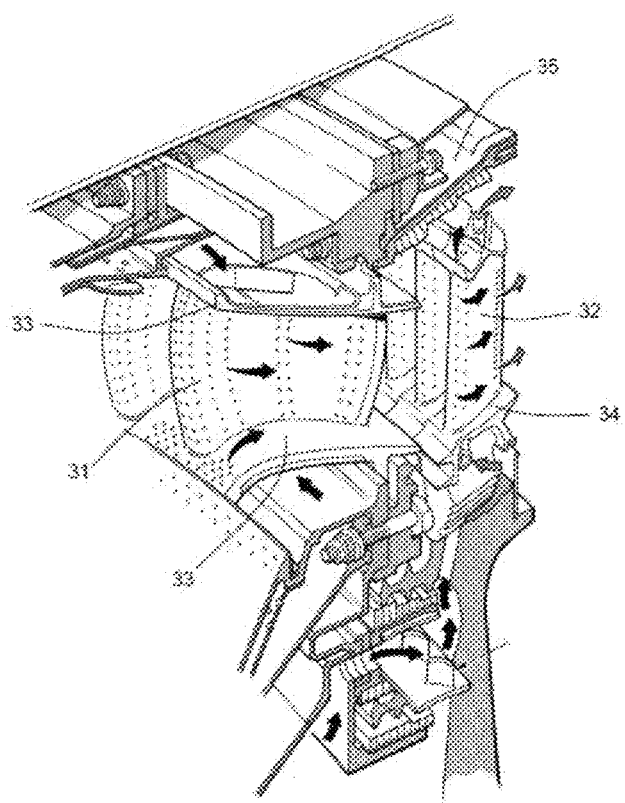
FIG. 2 illustrates a circumferential portion of a turbine section of a gas turbine engine.

Aerofoil shapes for gas turbine engines, such as propellers, fans, compressors, turbines and the endwalls thereof are manufactured using component specific complex industrial processes. The quality of the manufacturing and the resulting shape of the parts influence the engine performance, the manufacturing yield, and the cost of production. Once manufactured, the gas washed surface/aerofoil shape is typically inspected with a suitable technique to determine whether the component has the requisite characteristics and is thus fit for purpose.

One way to determine whether a component is fit for purpose is to gather surface geometry data using, for example, a co-ordinate measurement machine, CMM, to obtain two-dimensional surface contours. Alternatively, a more sophisticated three-dimensional optical scanning technique can be used to give a comprehensive surface representation. Other suitable methods as known in the art may be used.

Once data for a given component has been collected using an appropriate technique, it is compared with a set of limits which are defined against a design intent or reference shape. That is, the measured component is compared to a predetermined shape to which a manufacturing tolerance has been applied. If the measured component includes portions out of tolerance then it is rejected as not fit for purpose. If it is within the stipulated tolerance, it is accepted.

The geometric variables for a typical gas washed surface such as an aerofoil can include several dimensional considerations. These may include concave and convex contouring, aerofoil thickness, wall thickness, chordal twisting, spanwise bowing, leading and trailing edge contouring and lean, amongst others. Such a large number variables makes it extremely difficult to set accurate tolerances for the acceptability of a component. Hence, the tolerances are generally more conservative than they need to be. This results in unnecessarily high scrappage rates of manufactured parts which can be costly, particularly when the components are complex and/or made from exotic materials such as those typically used in aero gas turbine engines and the aerospace industry more broadly.

One approach to combat this involves an assessment of performance of a component and uses this to reduce the scrappage rate and quality of gas washed components in a number of ways.

The first way of utilising the performance data of a component is to set performance thresholds for a component and use these to determine whether a part is acceptable. The performance thresholds may be predicted thresholds and represent acceptable levels of performance against which a manufactured component can be assessed.

A second way the performance data of a component can be used is to provide a secondary conformance step for a part which has a portion outside of an acceptable geometric design envelope. Thus, where a component has one or more points outside of a geometric limit or tolerance, the performance effects of the otherwise non-conforming product can be assessed with a view to accepting or rejecting it.

A third way uses performance data to establish geometric sensitivity at different locations with a view to setting point or zone specific tolerance limits or bands. In doing so, it enables a tolerance band or threshold to be established for different areas of a gas washed surface such that areas of lower performance sensitivity can be given a more relaxed geometric tolerance and areas of high performance sensitivity a more stringent tolerance threshold. The use of such performance banding can be established using performance sensitivity of a gas washed surface design, or from a performance sensitivity combined with measured data taken from manufactured components to provide a predicted performance measure for manufactured parts.

A fourth use of the performance sensitivity data is in the adaptation of a manufacturing process where manufacturing variables can be adjusted on the basis of performance sensitive areas of a component, areas which are geometrically sensitive in a manufacturing process, or a combination of the two. Thus, in areas of higher performance or geometric/manufacturing sensitivity, the process can be controlled to within tighter tolerances.

Hence, performance sensitivity of a component can be used in the manufacturing process and/or inspection to help reduce scrappage and allow higher quality components to be produced. Further, the performance sensitivity of a component can be used in the selective setting of parameters in the manufacturing process. As such, process variables are controlled in accordance with the performance sensitivity so that, for example, the regulation or application of pressure, or the cooling in particular areas of a component during a moulding or casting step can be tailored according to the high sensitivity areas. Supplementing a production line using the performance sensitivity criteria can be done during the development of a process line, or as part of a regular review or feedback loop to adjust or include further monitors or parameters for high sensitivity areas.

The use of performance sensitivity to assess or manufacture a component is potentially applicable to any complex component in which a high degree of conformity is required. This is particularly so where the shape is complex such as aerofoils which are inherently three dimensional and the external geometry has a direct impact on performance. However, as will be appreciated, there are many other fluid washed surfaces in aerospace and other industries which may also benefit from the approach offered by the invention. The invention finds particular utility in gas turbine engines, and aerofoils of gas turbine engines. As such, the following examples consider a high pressure gas turbine blade but this should not be taken to be limiting.

Geometric Threshold+Performance Threshold

A first example involves a process in which a manufactured component is assessed against a geometric tolerance threshold or band and non-conforming components assessed for performance effects to determine whether they are nonetheless acceptable for use.

The method of producing a gas washed component begins by providing a reference component having a reference shape. The reference shape defines the design intent for a component according a predefined criteria or performance requirement.

A geometric threshold or band is set for the reference shape in which the threshold band defines predetermined/acceptable limits of geometric deviation from the reference shape. The geometric deviation from the reference shape may be determined by an assessment of the mechanical or aerodynamic requirements of the components as is commonplace in the art. For example, the geometric threshold may be defined on a basis of a minimum wall thickness for stress purposes.

Once the reference shape is provided, a manufactured component may be produced using a given manufacturing process. The manufactured component is measured and the measurements assessed to determine whether any points of the component fall outside of the geometric limits which can be tolerated for the reference shape.

Where no points fall outside of the limits, the part can be accepted use. The use may include further manufacturing processing steps or for installation in to a larger system. As will be appreciated, the system may be a complex product having a plurality of interacting parts. Such a complex product may be a gas turbine engine.

Where one or more points fall outside of the geometric threshold limit(s), the manufactured component may be further assessed to determine the performance effect of the non-conformance. To assess the performance, a sensitivity distribution may be determined for the reference component. The performance sensitivity distribution may have a plurality of points, each point indicative of a performance sensitivity factor for the reference component at a particular location.

A performance threshold may be set for the performance sensitivity distribution. The performance threshold may be a cumulative figure for the performance parameter chosen for the performance sensitivity distribution.

The performance sensitivity distribution and manufactured component measurements may be combined to determine the predicted performance effect of the non-conforming part, and whether the performance of the manufactured component is within the predetermined performance threshold.

The reference component can be any which is to be subjected to the analysis described herein and incorporates the design intent or ideal or reference shape of a given component. The component will have a gas washed surface and may be any gas washed surface including but not limited to a propeller, impeller, fan, compressor, turbine or the endwall thereof. As stated above, the method is particularly useful for aerofoil components which are inherently complex and are performance sensitive to geometric variations. In the following example, the component is an aerofoil for a turbine blade but this should not be taken to be limiting the method and any gas washed surface of a gas turbine engine or otherwise could potentially be a candidate for the described method. Determining the reference component can include determining what the reference shape will be, or simply obtaining a predetermined reference component for the purpose of carrying out the method.

The geometric tolerance threshold or band provides a limit against which the geometric constraints of a component can be defined. Referring to FIG. 4, there is shown a transverse section of a generic gas turbine blade which provides the reference shape, similar to that shown in FIG. 3 and having corresponding reference numerals incremented by 100. The threshold limit in this instance is provided as an envelope around the component as indicated by the dashed line 424. The envelope 424 is offset from the external wall of the aerofoil, it being spaced from the wall by a predetermined amount. The threshold limit or band may be uniformly spaced around a line or across a surface. The surface may be the entire surface being assessed. For example, where the surface being assessed is an aerofoil, the threshold may represent a uniform offset from the reference shape over the entire surface. Alternatively, the threshold may be area or point specific and may vary in extent.

A similar limit 426 may be set within the component wall so as to provide a threshold band which provides a maximum and minimum deviance from the design intent. Hence, a tolerance band is created around the component with an outer limit and an inner limit. The outer and inner limit may also be considered to be an upper and lower limit.

It will be appreciated that the geometric threshold band or limit may be set by choosing a specific dimensional constraint based upon a tolerable variance, such as an acceptable wall thickness and may be area, line or point specific.

If the manufactured component fits within the geometric tolerance band then the component is accepted for further manufacturing steps such as machining of holes or the application of a surface finish treatment, or, for installation in a working engine depending on when the assessment is carried out. Hence, taking the reference shape of FIG. 4 to be a manufactured component, will allow it to be accepted.

The manufacture of the components will be highly dependent on the type of component being made. For example, for a high pressure turbine blade, the component may be made from a metallic or ceramic material as known in the art. A metallic blade may include a number of cooling features such as passageways and outlets to provide cooling air to key locations on the interior and exterior of the blades. Typically, such blades are made using a lost wax casting process which provides a near net shape product which undergoes some surface machining to provide the desired aerofoil shape. Similar machining may or may not be required for ceramic components. It will be appreciated that yet further respective manufacturing techniques may be used for these and other components such as the low pressure turbine, compressor and fan blades for example.

FIG. 5 shows a portion of a non-conforming component 510. Hence, there can be seen an exterior surface of a manufactured component 512 and the tolerance limit 514 on the exterior of the surface. As can be seen the component boundary extends over the threshold limit away from the design intent to an extent that requires a non-conformance and further analysis. The non-conformance may be the only point or portion on the surface of the component, or may be one of many. It may be possible to set one or more further thresholds which allow a certain amount of non-compliance with the threshold limit. For example, where the non-compliance covers only a small area, or is in a non-critical area of the component.

Figure 6:
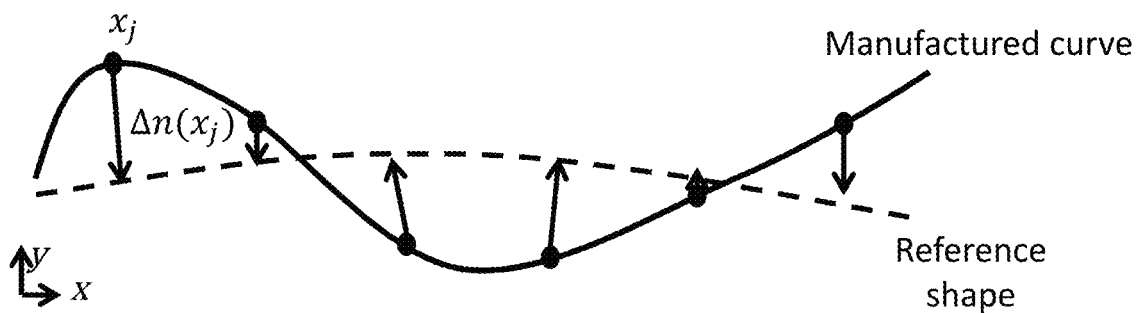
FIG. 6 illustrates a line displacement of a manufactured surface from a reference shape.
Figure 7:
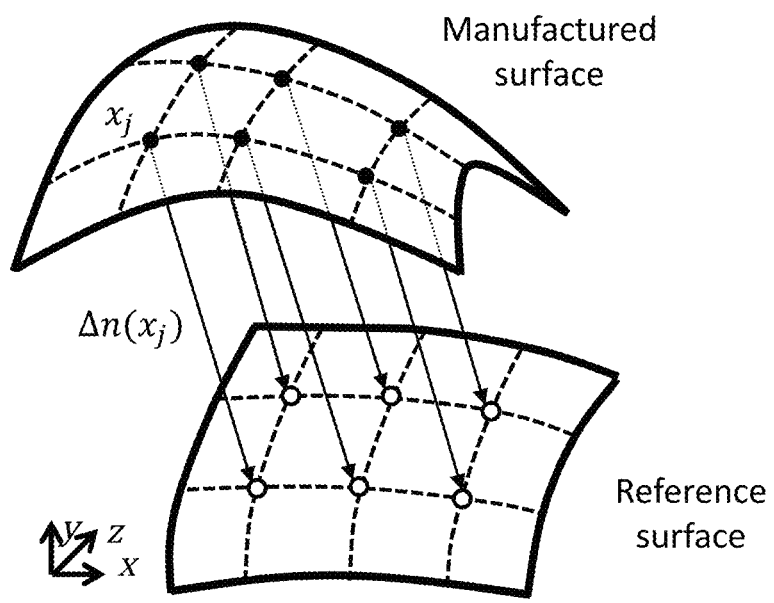
FIG. 7 illustrates a surface displacement of a manufactured surface from a reference shape.
Figure 8:
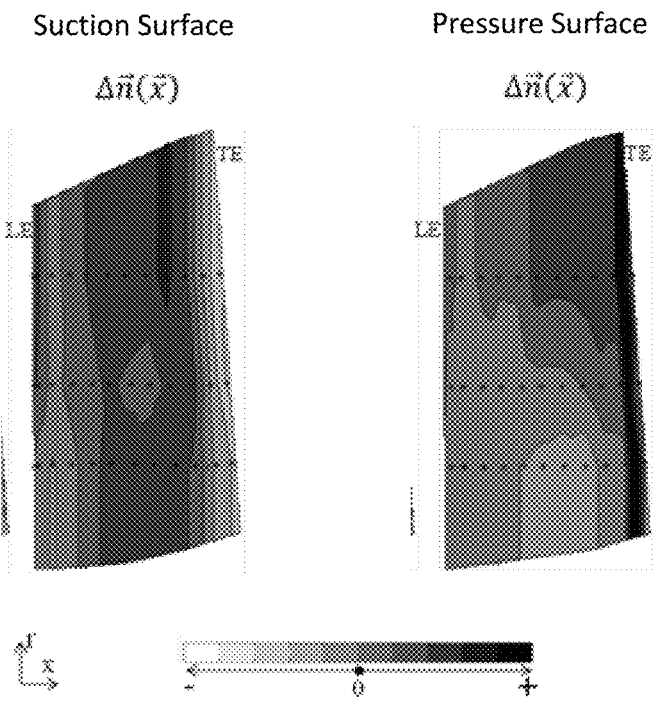
FIG. 8 shows a displacement distribution/displacement map for the suction surface and pressure surface of an aerofoil.

The measurements can be made using any suitable known method which will provide a data set that can be combined with the parameter sensitivity map. Suitable methods may include the use of a coordinate measurement machine, CMM, or alternatively a three dimensional optical surface scan or X-ray analysis as are generally known in the art for component and turbine blade inspections. The measurements provide point-to-point or continuous deviations from the reference shape as is shown in FIGS. 6 and 7 for a line measurement or surface measurement respectively. The spatial distribution of the displacements, also referred to as the displacement distribution, can be derived with the interpolation of the data collected from the surface inspection of the aerofoil. The surface displacements may be represented by a map such as that shown in FIG. 8 which depicts the suction surface and pressure surface of an aerofoil, but can simply be a collection of data.

The surface displacements may be used to assess whether any of the surface vector displacements $\Delta \vec{n}(\vec{x}_j)$ go beyond the acceptable threshold limit(s) as described above.

In the case of a non-compliance, the performance of the component is assessed to determine whether the out of scope feature is within a permitted level of performance or whether the geometric non-conformance has impacted the predicted performance to an unacceptable limit.

In order to assess the performance of the component a performance sensitivity distribution (or performance sensitivity map) is used. The performance sensitivity distribution is a representation of sensitivity in terms of a performance factor. The performance factor may be any of interest to the component designer and include any parameter that measures the effectiveness, efficiency, pressure loss or the flow amount of the parts or of the engine. These may include aerodynamic efficiency, isentropic efficiency, polytrophic efficiency, flow level, flow capacity, pressure ratio, specific work, degree of reaction and aerodynamic loss for example. Also thrust coefficients, lift and drag coefficients and associated ratios and discharge coefficients. The sensitivity distribution may be a graphical representation, a function or a collection of data.

Equation 1 gives $F_i$ as the performance sensitivity distribution for an Objective$_i$:

$$F_i(\vec{x}) = \frac{d\, Objective_i(\vec{x})}{d\vec{x}} \quad \text{(Equ. 1)}$$

in which $\vec{x}$ is the spatial vector position as shown in FIG. 6 for a simple two dimensional case and FIG. 7 for a three dimensional shape and as discussed in relation to the measurements above. The Objective is the chosen performance factor as described in the preceding paragraph.

The calculation of the spatial distribution of the sensitivity factor, or performance sensitivity distribution, of a given performance parameter for a given part at specific operating conditions may be achieved using advanced analytical tools such as those used for the flow path analysis as known in the art. These may include computational fluid dynamic, CFD, software in which the spatial distribution of the sensitivity factors can be calculated using dedicated Design of Experiments techniques or Adjoint (or gradient based) methodologies with CFD. Such methods are adequately described and referenced "Gradient-Based Adjoint And Design Of Experiment Cfd Methodologies To Improve The Manufacturability Of High Pressure Turbine Blades"; ASME Turbo Expo 2016: Turbomachinery Technical Conference and Exposition, Volume 2C: Turbomachinery, Seoul, South Korea, Jun. 13-17, 2016 and as provided in the priority application GB1609858.4. All references described in the appended paper are incorporated by reference herein.

Figure 9:
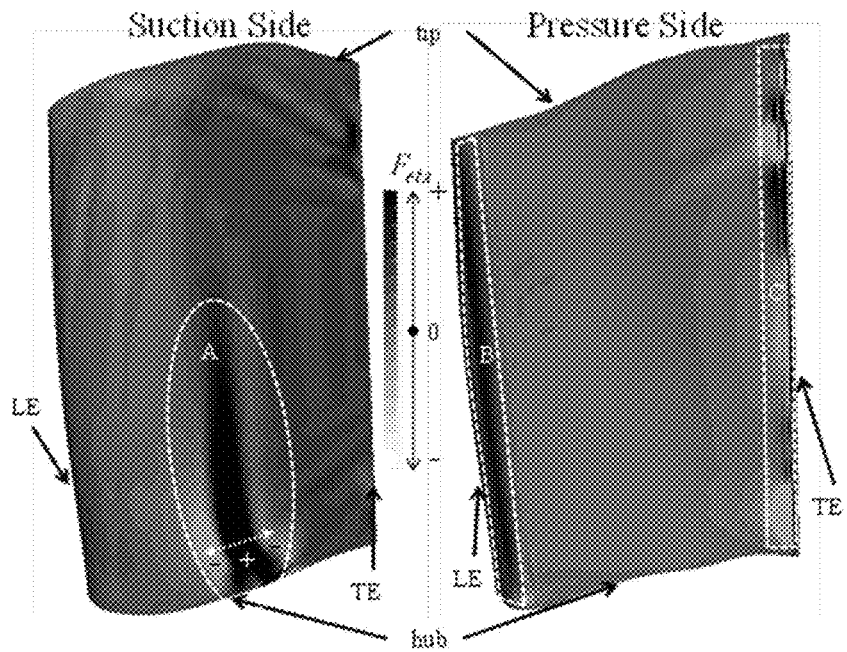
FIG. 9 shows a performance sensitivity distribution/sensitivity map for a suction surface and pressure surface of an aerofoil.

An example of the calculated spatial distribution of the sensitivity factor of turbine efficiency on the pressure and suction surface of a turbine blade is given in FIG. 9. FIG. 9 shows a representation of the suction and pressure surfaces of a turbine gas washed surface in the form of a turbine aerofoil. The contours on the aerofoil show the performance sensitivity of the aerofoil surfaces of a given performance objective with the highest identified by the letters A, B and C.

One of the highest performance sensitivity areas is located in zone A which is located at the suction surface peak or mid-chord region and extends spanwise from the root or hub of the aerofoil towards the radial mid-point of the aerofoil and chordally along 10-15% of the axial length of the aerofoil. Zone B is located towards the leading edge, LE, of the aerofoil on the pressure surface and extends the full span of the aerofoil from root to tip. Zone C is generally located towards the trailing edge, TE, of the aerofoil and extends spanwise from the root to the tip with a distribution of sharply contrasting sensitivities. The sharply contrasting areas of sensitivity are due to software anomalies resulting from highly unpredictable turbulent flow at the trailing edge. Nevertheless, the trailing edge region is considered to be a performance sensitive zone of a compressor or turbine aerofoil.

The displacement distribution described above involves assessing the spatial distribution of surface displacements of manufactured parts relative to the design intent or reference shape. Thus, the displacement distribution can be determined by measuring the shape of a manufactured part at various points and comparing these with a reference shape to provide a comparison or variance of the manufactured component. The surface displacements are interpolated on the same point references or computational grid used for the analytical flow solution for the performance sensitivity map. The interpolation used can be any of those available in the literature such as linear, cubic or polynomial.

In some embodiments, the numerical grid or mesh used to establish the performance sensitivity distribution may be altered to match the measurement points taken from the manufactured parts to allow the spatial control points for the acquisition of the geometric displacements and that used for the calculation of the distribution of the sensitivity distribution to be consistent. Thus, measuring the manufactured component and determining a displacement distribution indicative of the geometric deviation of the manufactured component from the reference shape may include taking discrete measurements of geometric displacements at predetermined locations on the component in which the predetermined locations correspond to the points at which the performance sensitivity distribution is calculated After the spatial distribution of both the manufactured surface displacements and the sensitivity distribution are calculated, Equation 2 below allows the assessment of the predicted performance effect due to the variation from the design intent shape of each part considered in the process. Thus, Equation 2 provides a way of combining the performance sensitivity distribution and displacement distribution to provide a figure for the performance effect. That is, it can provide the difference between the performance of the reference component and the predicted performance of a manufactured part.

Equation 2 can also be used in the form a surface integral using CFD post-processing solver or other analytical tool such as Equation 3.

$$\Delta F_i = \sum_{j=1}^{N_{points}} F_i(\vec{x}_j) \cdot \Delta \vec{n}(\vec{x}_j) \quad \text{(Equ. 2)}$$

$$\Delta F_i = \int_{Surface} F_i(\vec{x}_j) \cdot \Delta \vec{n}(\vec{x}_j) \, dA \quad \text{(Equ. 3)}$$

$\Delta F_i$ is the effect on the performance sensitivity distribution $F_i$ of each individual parts of component, $\Delta \vec{n}(\vec{x}_j)$ is the length (with sign) of the projection vector of a point on the true surface onto the corresponding point on the reference surface. N_points is the number of points analysed in the analytical tool or during the quality inspection or scan of the part.

The threshold for the performance may be given as, for example, + or −50% of the initial performance factor value.

The performance sensitivity may be assessed against a performance threshold for the component in which the performance sensitivity at each location on the component is summed to provide a single performance figure. This figure can then be compared with a threshold value. Thus, once the performance threshold has been set and the output of Equation 2 obtained, an assessment as to whether to accept the component can be made.

The acceptance of the component may be made on a case-by-case basis. That is, each component can be assessed against a single performance threshold before being accepted or rejected for further processing or installation in a complex product such as an engine. Alternatively, or additionally, the performance threshold may include a consideration of the overall performance of the complex product. In such an instance a batch of components may be manufactured to provide a predetermined set of components which act cooperatively or synergistically within a complex product. Such a set may be common parts within an engine. For example, the parts may be those of a rotor or stage of a compressor or turbine. Hence, all of the blades of a turbine row may be assessed as a set.

Thus, an additional or alternative step may be to assess the effects of the manufacturing variations of a plurality of parts on a given product performance as a whole. In this case, the individual part performance effect can be added together or statistically averaged to calculate the combined effect with similar parts and provide a holistic performance figure for the product. In this instance, some of the individual parts may not have a sufficient predicted performance when considered in isolation of a set of parts, but the average of the set of parts is sufficient.

This concept may be extended to include a plurality of other components which act in unison within a complex part. Thus, the performance threshold may be adjusted to account for a system performance of a turbine stage. This would include a consideration of some or all of the constituent parts such as the seal segments, vane and blade platform endwalls and aerofoils.

Figure 10:
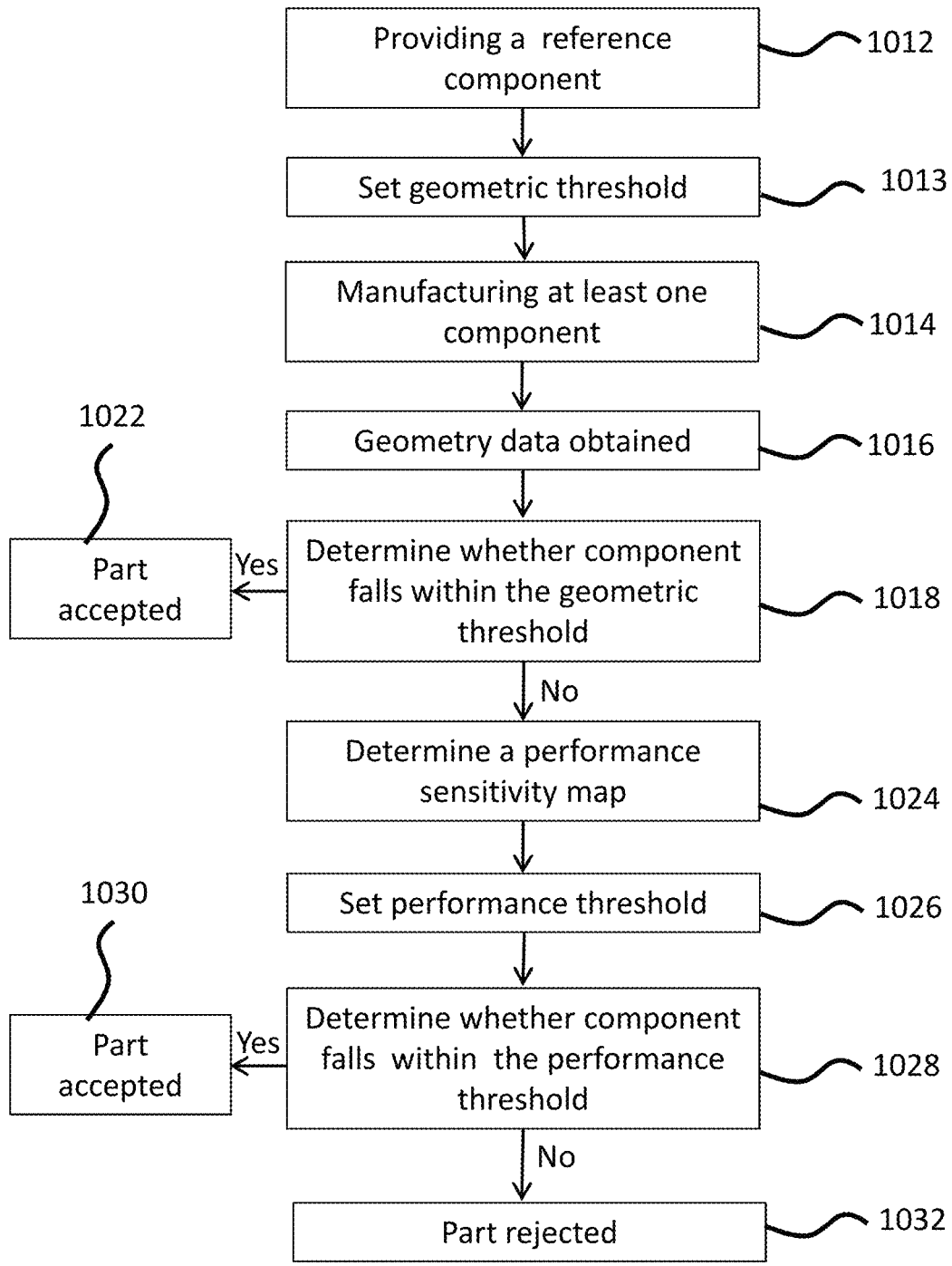
FIG. 10 is a flow diagram illustrating a first use a performance sensitivity in the assessment of a manufactured component.

Referring to FIG. 10, the steps for Example 1 are now explained. The first step 1012 is the provision of a reference component, together with a tolerance band of the reference component 1013. At least one component is made to the reference shape 1014 and its geometry measured 1016.

An assessment is then made to determine whether the component geometry falls within the permitted design envelope 1018. If the determination is affirmative, then the part can be accepted for the next manufacturing process step, or for final acceptance and installation within an engine 1022. If the component is out of tolerance it is passed for further analysis.

A spatial distribution of the sensitivity factor performance parameter for the component is calculated 1024, using for example, the technique described above. A performance tolerance band is set for the reference shape 1026. The tolerance band or threshold for the acceptable performance difference from that of the reference shape of a given component or part will be dependent on the performance parameter under evaluation and the required component performance needed to meet the component expectations for the engine design. The skilled person will appreciate that this is case specific.

The performance of the non-conforming component can then be assessed against the performance threshold and the part either accepted 1030 or rejected 1032.

It will be appreciated that the method steps described above may be carried out in any order, contemporaneously or simultaneously, except where the logical flow of the sequence prevents it. For example, the performance threshold may be set with the when the reference shape is generated and stored for future use, along with the geometric tolerance. However, the logical flow would prevent the performance threshold being generated before the reference shape is defined.

Performance Threshold

Figure 11:
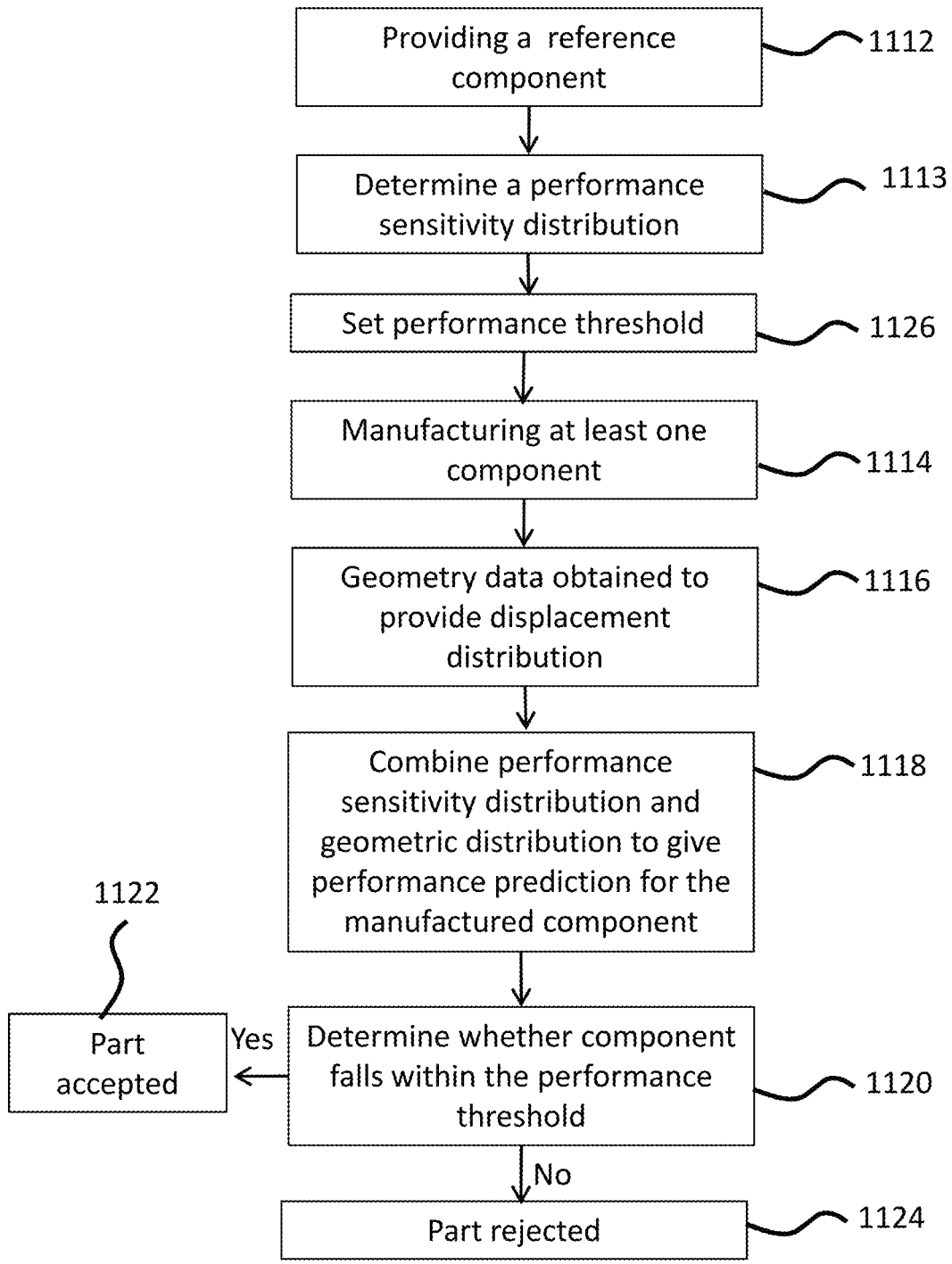
FIG. 11 is a flow diagram illustrating a second use a performance sensitivity in the assessment of a manufactured component.

In a simplified version of the above method, the geometric analysis of the component may be omitted. Thus, the assessment or conformance of the component may be achieved solely on the basis of performance threshold for the component. This is shown in FIG. 11. The first step 1112 is the provision of a reference component. A spatial distribution of the sensitivity factor performance parameter for the component is calculated 1113, using for example, the technique described above. A performance tolerance is set for the reference shape 1126. The performance tolerance may be in the form of one or more limits defining a range, band or threshold and relate to the acceptable performance difference from that of the reference shape of a given component or part. The performance tolerance will be dependent on the performance parameter under evaluation and the required component performance needed to meet the component expectations for the engine design. The skilled person will appreciate that this is case specific.

At least one component is made to the reference shape 1114 and its geometry measured 1116. The displacement distribution for the manufactured component is then combined with the sensitivity distribution 1118, for example, by using equation 2 above. From this, it is possible to determine whether the manufactured component has a predicted performance which falls within the predetermined performance tolerance 1120.

The performance tolerance may be a single value for the component, or may be point or zone specific. For example, the performance threshold may relate to the component as a whole, or may relate to a particular area so as to be more tightly controlled on some areas of the gas washed surface.

If the predicted performance fits within the performance threshold the component can be accepted for use or further manufacturing processing 1122. In the alternative, the part can be rejected 1124. The rejection of the part may be final, or may result in further processing on the part to improve the geometric shape and resultant performance.

It will be appreciated that the method steps described above may be carried out in any order, contemporaneously or simultaneously, except where the logical flow of the sequence prevents it. For example, the performance threshold may be set with the when the reference shape is generated and stored for future use. However, the logical flow would prevent the performance threshold being generated before the reference shape is defined.

Performance Sensitivity Threshold Banding

Performance sensitivity threshold banding uses a performance sensitivity distribution for a component to analyse which areas or points of the component are particularly sensitive to geometric variance in terms of performance. Once these areas or points have been identified, they may be used to determine a geometric tolerance for a particular zone of or point on the component. The geometric tolerance may be in the form of one or more limits which provide a threshold or geometric range for the specified zone. The performance sensitivity distribution may be a graphical representation, a function or a collection of data.

The performance sensitivity distribution may be used in isolation to establish the tolerance zones or may be combined with measured data which represents the geometric variations from a design intent or reference shape of a given manufacturing process. This combination provides a qualitative assessment of a component which is produced by a given manufacturing process and allows an assessment of the product on a performance specific basis. The combination of the performance sensitivity distribution and manufacturing data may provide a manufacturing-performance distribution which can be used to provide design rules for finishing a product or for inspecting it prior to acceptance for and actual installation in an engine. The design rules may be in the form of a tolerance banding or a tolerance threshold which is location specific to the component geometry and accounts for the performance sensitivity of the geometry.

Thus, point or zone specific tolerances can be set for a component using performance sensitivity or a combination of performance sensitivity and displacement distributions for a given manufacturing process. In one example, a family or set of components, such as the turbine or compressor blades in a particular row, can be produced with common geometrical tolerance bands for similar areas. Hence, each blade in a set will have one or more highly sensitive areas, such as the mid-chord region of the suction surface, which has a first tightly controlled tolerance band, whilst a second lesser sensitive area, such as the trailing portion of the suction surface can have a second more relaxed tolerance. Ensuring that the majority of the blades within a set adhere to specific distributed tolerance bands such as this can improve the performance of the gas turbine engine whilst reducing the scrap rate on constituent components.

Figure 12:
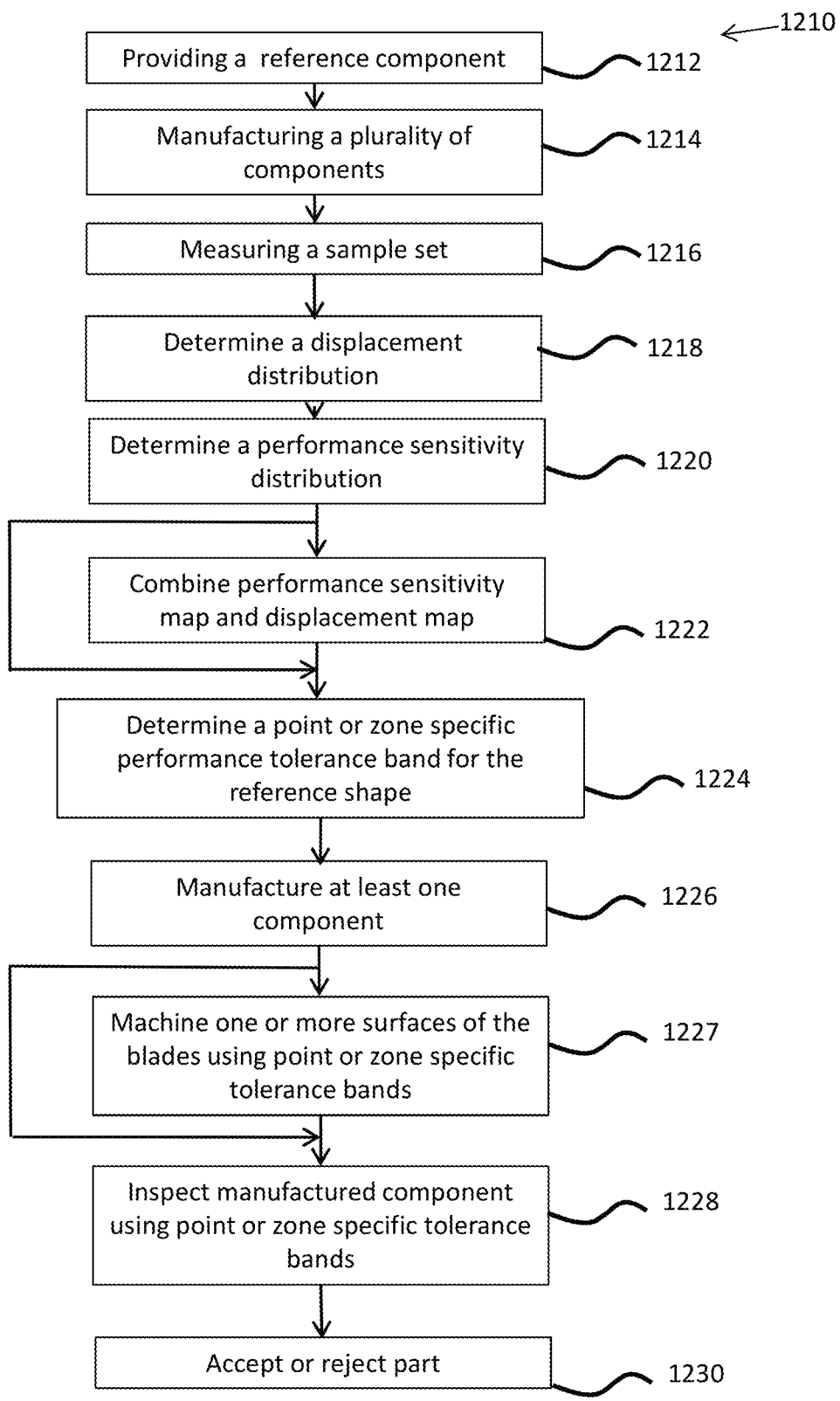
FIG. 12 is a flow diagram illustrating a third use of a performance sensitivity in the assessment of a manufactured component.

A method 1210 of producing an aerofoil component for use in a gas turbine engine is shown in the block diagram of FIG. 12 and may comprise: providing a reference component having a reference shape with a gas washed surface 1212; manufacturing a plurality of components according to the reference component 1214; measuring the surface of a sample set of the plurality of components 1216 and providing a displacement distribution/map 1218 showing the geometric variation of the manufactured component relative to the reference shape. The method may also include determining a performance sensitivity distribution 1220 for the reference component. The performance sensitivity distribution may have a plurality of zones or points, each zone or point being indicative of a performance sensitivity factor for the reference component. The performance sensitivity distribution may be used to set local threshold bands which are zone or location specific. Thus, a gas washed surface may have high tolerance bands and low tolerance bands for inspection purposes. The same tolerance bands may additionally or alternatively be used for subsequent manufacturing stages.

Additionally or alternatively, the performance sensitivity distribution and displacement distribution may be combined to provide a manufacturing-performance sensitivity distribution 1222 for the reference component shape. The manufacturing-performance sensitivity distribution may be used to set local threshold bands which are zone or location specific. Thus, a gas washed surface may have high tolerance bands and low tolerance bands for inspection purposes based on a combination of the performance sensitivity and geometric variance which can be expected from a given manufacturing process. The same tolerance bands may additionally or alternatively be used for subsequent manufacturing stages.

The subsequent manufacturing stages may include machining 1226 the outer surface of the production component to ensure that each zone of the production component is within the predetermined geometric tolerance for each corresponding zone of the reference component. Additionally or alternatively, the method may include measuring the geometry 1228 of the production component in one or more of the plurality of zones and determining whether the geometry is within the geometric tolerance for each of the corresponding plurality of zones of the reference shape, and accepting 1230 the production component for use if the geometry of the production component if it is within the geometric tolerance, or rejecting 1230 the production component if the geometry is outside of the geometric tolerance. It will be appreciated that the inspection process of steps 1228 and 1230 may also or alternatively be carried out before any final machining or processing steps. Further, the inspection may be carried out during the machining process, particularly where an adaptive machining process is carried out in which a closed feedback loop is used to assess the machined surface during machining.

With the zone or point specific tolerance limits determined, manufactured components can be assessed. The manufactured components may be those taken from the sample set, or additional components manufactured later 1224.

The reference component can be any which is to be subjected to the analysis described herein and incorporates the design intent or ideal or reference shape of a given component. The component will have a gas washed surface and may be any of a propeller, impeller, fan, compressor, turbine or the endwall thereof. The method is particularly useful for aerofoil components which are inherently complex and are performance sensitive to geometric variations. In the following example, the component is an aerofoil for a turbine blade but this should not be taken to be limiting the method and any gas washed surface of a gas turbine engine could potentially be a candidate for the described method.

The manufacture of the components will be highly dependent on the type of component being made. For example, for a high pressure turbine blade, the component may be made from a metallic or ceramic material as known in the art. A metallic blade may include a number of cooling features such as passageways and outlets to provide cooling air to key locations on the interior and exterior of the blades. Typically, such blades are made using a lost wax casting process which provides a near net shape product which undergoes some surface machining to provide the desired aerofoil shape. Similar machining may or may not be required for ceramic components. It will be appreciated that yet further respective manufacturing techniques may be used for these and other components such as the low pressure turbine, compressor and fan blades for example.

A batch of components are manufactured to the reference shape. The reference shape is the same as that used for the performance sensitivity distribution described in more detail below. Once manufactured a sample set of the batch of components is analysed to determine the difference of the finished shape to the design intent. The size of the sample set of components selected for analysis should be sufficient to provide a statistical cross-section which will represent the possible design variations resulting from the manufacturing. The sample set may be all of the components produced from a given run of the process, or may be a single component where the monitoring of or feedback into a production process is required. It will be appreciated that the size of the sample set will likely depend on the component and possible manufacturing variations.

The measurements can be made using any suitable known method which will provide a data set that can be combined with the parameter sensitivity distribution. Suitable methods may include the use of a coordinate measurement machine, CMM, or alternatively a three dimensional optical surface scan or X-ray analysis as are known in the art for turbine blade inspections. The measurements provide point-to-point or continuous deviations from the reference shape as is shown in FIGS. 6 and 7 for a line measurement or surface measurement respectively.

The spatial distribution of the displacements can be derived with the interpolation of the data collected from the surface inspection of the aerofoil. The surface displacements are used in Equation 2 below in the form of the projection of the geometric displacements to the reference surface $\Delta \vec{n}(\vec{x}_j)$. An example of the interpolation of the manufactured displacements for a typical turbine blade surface is shown in FIG. 8b and FIG. 9b for the suction and pressure surface respectively. Here it can be seen that there are geometric variations spread over the pressure surface and suction surface. These displacement distributions, although shown as graphical representations, may be held as data without being reduced to a physical representation.

The displacement distributions may be used in conjunction with the performance sensitivity distributions which are now described. The performance sensitivity distribution provides information as to which portions of a component, or more specifically, which portions of the gas washed surface of the component, are sensitive to geometric variation. This is not a consideration of the geometric variation itself, just where the component is most sensitive to geometric variation per se.

The sensitivity distribution is a representation of sensitivity in terms of a performance factor. The performance factor may be any of interest to the component designer and include any parameter that measures the loss, effectiveness, efficiency, pressure loss or the flow amount of the parts of the component. These may include aerodynamic efficiency, isentropic efficiency, polytrophic efficiency, flow level, flow capacity, pressure ratio, specific work, degree of reaction and aerodynamic loss for example. Also thrust coefficients, lift and drag coefficients and associated ratios and discharge coefficients.

Equation 1 above gives the $F_i$ as the performance sensitivity factor for the Objective$_i$. The Objective is the chosen performance objective as described in the preceding paragraph.

An example of the calculated spatial distribution of the sensitivity factor of turbine efficiency on the pressure and suction surface of a turbine blade is given in FIG. 9.

Thus, FIG. 9 shows a representation of the suction and pressure surfaces of a turbine gas washed surface in the form of a turbine aerofoil. The contours on the aerofoil show the performance sensitivity of the of aerofoil surfaces of a given performance objective with the highest identified by the letters A, B and C.

One of the highest performance sensitivity areas is located in zone A which is located at the suction surface peak or mid-chord region and extends spanwise from the root or hub of the aerofoil towards the radial mid-point of the aerofoil and chordally along 10-15% of the axial length of the aerofoil. Zone B is located towards the leading edge, LE, of the aerofoil on the pressure surface and extends the full span of the aerofoil from root to tip. Zone C is generally located towards the trailing edge, TE, of the aerofoil and extends spanwise from the root to the tip with a distribution of sharply contrasting sensitivities. The sharply contrasting areas of sensitivity are due to software anomalies resulting from highly unpredictable turbulent flow at the trailing edge. Nevertheless, the trailing edge region is considered to be a performance sensitive zone of a compressor or turbine aerofoil.

Using the above approach, a plurality of tolerance bands may be set for the component. Each tolerance band may be specific to a geometric location of the component and may be have a narrower tolerance band or lower threshold limit depending on the performance sensitivity at that location. Thus, a reference shape may be attributed with a first tolerance band at a first location and a second tolerance band at a second location, the first and second tolerance bands being separately determined on the basis of the performance sensitivity. The first and second tolerance bands may be the same, overlap or be different, as required by the local performance sensitivity. The component may be portioned into zones. The zones may include a baseline zone in which a conventional geometric tolerance is set, and performance specific zones where the tolerance bands are determined on the bases of the performance sensitivity distribution.

In some examples, the performance distribution may be further refined to take account of the expected performance for a given component made using a specific manufacturing process using the aforementioned displacement distribution. The displacement distribution provides the spatial distribution of surface displacements of manufactured parts relative to the design intent or reference shape. Thus, the displacement distribution can be determined by measuring the shape of a manufactured part at various points and comparing these with a reference shape to provide a comparison or variance of the manufactured component. The surface displacements are interpolated on the same point references or computational grid used for the analytical flow solution for the performance sensitivity distribution. The interpolation used can be any of those available in the literature such as linear, cubic or polynomial.

In some embodiments, the numerical grid or mesh used to establish the performance sensitivity distribution may be altered to match the measurement points taken from the manufactured parts to allow the spatial control points for the acquisition of the geometric displacements and that used for the calculation of the distribution of the sensitivity distribution to be consistent.

After the spatial distribution of both the manufactured surface displacements and the sensitivity factor are calculated, Equation 2 above allows the assessment of the predicted performance effect due to the variation from the design intent shape of each part considered in the process. Thus, Equation 2 provides a form of combining the performance sensitivity distribution and displacement distribution to provide a manufacturing-performance tolerance distribution for the reference component.

Figure 14:
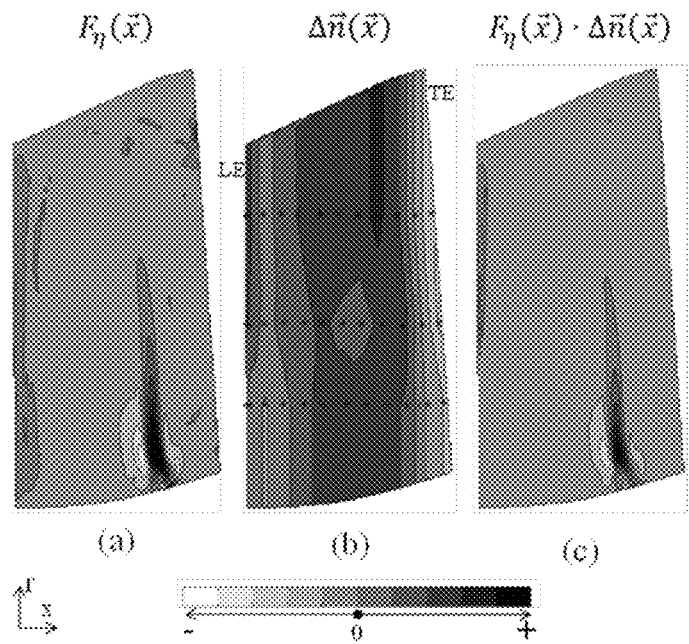
FIGS. 14 and 15 show suction and pressure surfaces for an aerofoil in which (a) shows the sensitivity distribution given by Equation 1, (b) shows the displacement distribution of a manufactured component, and (c) shows the combination of the sensitivity distribution given by Equation 2.
Figure 15:
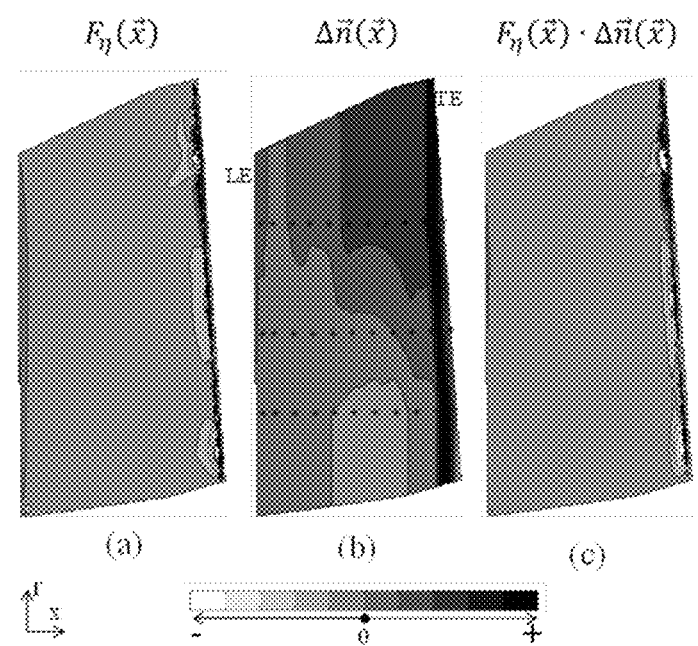

FIGS. 14 and 15 show suction and pressure surfaces for an aerofoil in which (a) shows the sensitivity distribution given by Equation 1, (b) shows the displacement distribution of a manufactured component, and (c) shows the combination of the sensitivity distribution given by Equation 2.

The manufacturing-performance tolerance distribution, shown in FIGS. 14(c) and 15(c), combines the sensitivity of the manufacturing process with the performance sensitivity of a component. In doing so, it provides a representation of the reference shape having different tolerance bands or thresholds against which a manufactured component can be assessed. Thus, in a post-manufacturing inspection procedure, the areas indicated at zone A and zone B in FIG. 9 can have a narrower tolerance threshold or band so that the dimensions in this zone are more tightly controlled.

Equation 2 can also be used in the form a surface integral using CFD post-processing solver or other analytical tool such as Equation 3.

The effects of the manufacturing variations of each individual part on a given engine performance can be added together or statistically averaged to calculate the combined effect with similar parts (such as all the turbine blade in a same row) or other different components of the gas turbine engine (such as compressors blade rows, turbine blade rows and endwalls).

The definition of the characteristic dimension can be any dimension which defines the relative shape of the part. Examples can be the chord of an aerofoil, the span height, the maximum thickness, the average geometric diameter. In case of other components the characteristic dimension can be the length in one direction or the hydraulic diameter of the endwalls.

Modification of a Manufacturing Process

The third example relates to a process in which the manufacturing geometric tolerance and the manufacturing process are adapted during the manufacturing process. This method can be implemented as an isolated or occasional assessment, or on an ongoing basis where manufactured products are regularly or continually assessed and the manufacturing process continually improved.

Figure 13:
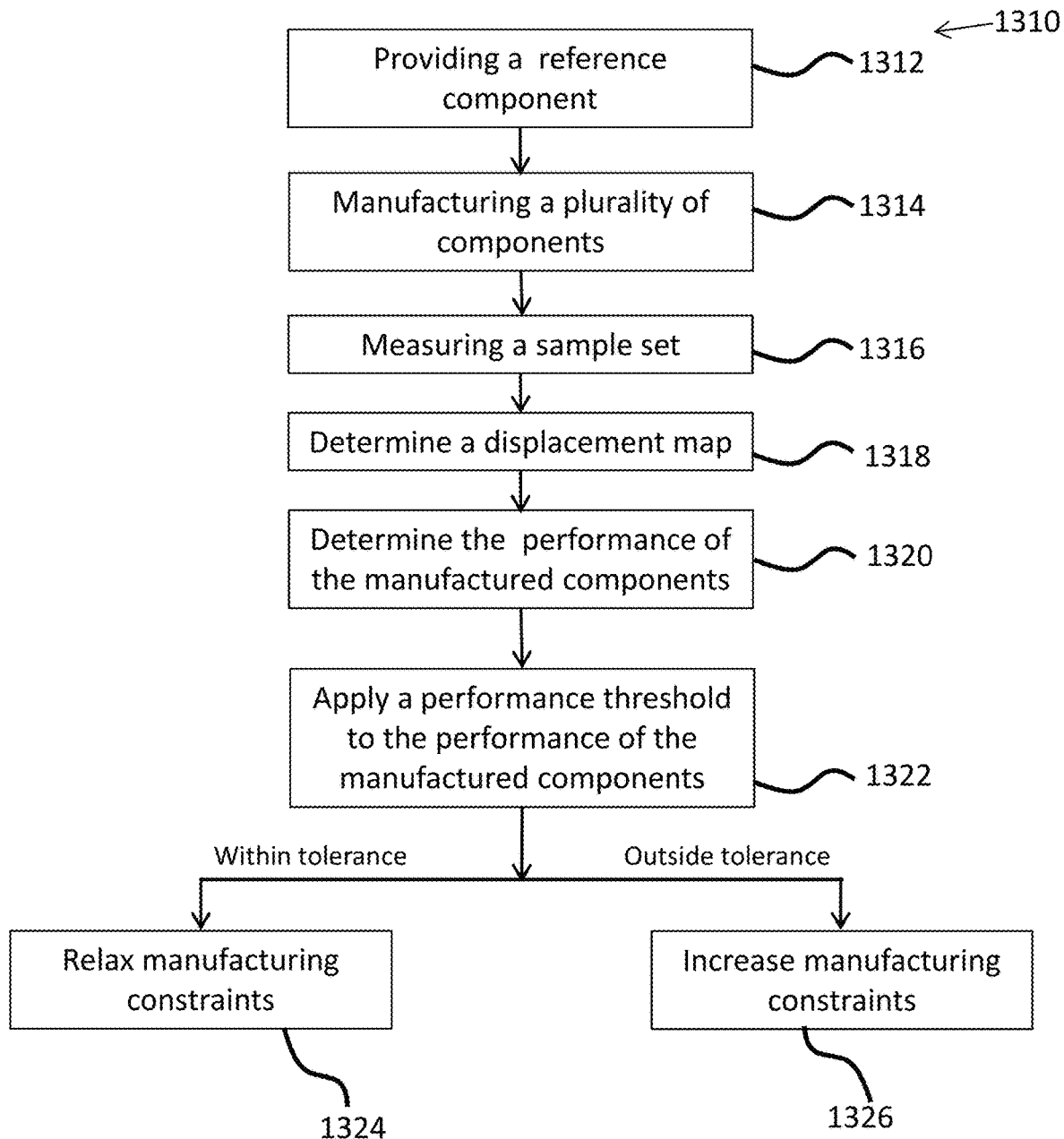
FIG. 13 is a flow diagram illustrating a fourth use of a performance sensitivity in the assessment of a manufactured component.

A method for manufacturing a gas washed surface 1310 is shown in FIG. 13. First a reference component is provided 1312. Next a plurality of components are made to the reference shape 1314 and a sample set measured 1316 to enable a geometric displacement distribution 1318 to be determined. The displacement distribution of the sample set is then analysed to determine the performance effect of the manufactured parts 1320. The performance effect is determined on a zone or point basis to allow the local performance effect to analysed. A predetermined performance threshold is used to determine whether the point or zone performance effect of the manufactured parts is within acceptable limits 1322. This can be applied to the whole or part of the surface under consideration. If the performance of a zone is acceptable, the manufacturing geometric tolerance can be relaxed in this area and the manufacturing process can be adjusted to reduce the accuracy or quality, if desired. If the point of zone falls outside of the acceptable performance threshold, then the manufacturing geometric tolerance can be increased, and the manufacturing process can be adjusted to provide tighter control of the manufacturing process.

Assessing the performance quality of manufactured components on a zone or point specific basis allows the manufacturing process to be adjusted to increase the performance quality of the manufactured parts, whilst simplifying the manufacturing.

If the local performance effect of the element or of the discrete point is within the predefined local-based performance tolerance band: the manufacturing geometric tolerance can be changed accordingly, typically be relaxing it but possibly be increasing it in the area. Alternatively, the manufacturing process can be changed to either increase or reduce the control of a given process step. Such process steps may include one or more of adjusting the time and pressure applied in the casting process of a component; adjusting the requirements of the surface finish, time or amount of local material removal in a machining process; adjusting the time and pressure used during a forging process in which the location and amount of pressure can be varied according to the local distribution of the sensitivity factor; adjusting the number of layers, local time of application and local material added during a coating process; changing the time, pressure, temperature and number of layers used during a lamination process for a composite part; altering the accuracy of a boring process.

The process described in connection with FIG. 13 includes the application of a performance threshold to a manufactured component. In the first instance, the performance threshold is applied to performance effect of the manufactured components. However, it is possible that the areas or zones of the components may be considered solely on the displacement distributions or the performance sensitivity.

Hence, if a sample set of components shows there is poor control in a particular area, these areas can be targeted to have tighter performance parameters. Alternatively or additionally, if a component is shown to have particularly high performance sensitivity in certain areas, then this can be justification enough to have the manufacturing parameter tolerances tightened in those areas.

Thus, a method of manufacturing may comprise: obtaining a reference component; determining a performance sensitivity distribution; identifying one or more points or zones of the component which has a relatively high (relative in the context of the component) performance sensitivity and setting one or more manufacturing parameters for that area to be more stringent. Thus, a component may have a first area in which the performance sensitivity is high and a second area in which the performance sensitivity is low. The area having a high performance sensitivity may have one or more associated manufacturing parameters which have a first range or limit. The area having a low performance sensitivity may have one or more associated manufacturing parameters which have a second range or limit. The first range or limit may be more tightly controlled than the other areas of the component. The second range may have a lower level of control that the other areas of the component.

Alternatively, the method of manufacturing may comprise: obtaining a reference component; manufacturing a plurality of components according to the reference component; measuring a sample set of components to determine which areas of the component demonstrate the most geometric variance when manufactured and setting one or more manufacturing parameters for that area to be more stringent. Thus, a component may have a first area in which the geometric variance is high and a second area in which the geometric variance is low. The area having a high geometric variance may have one or more associated manufacturing parameters which have a first range or limit. The area having a low(er) geometric variance may have one or more associated manufacturing parameters which have a second range or limit. The first range or limit may be more tightly controlled than the other areas of the component. The second range may have a lower level of control that the other areas of the component.

A further possibility is for the displacement distribution and performance sensitivity to be combined such that the performance effect of the manufactured parts can be determined and areas which have a resultant high performance effect monitored or controlled more stringently during manufacturing with tighter manufacturing parameters.

In the following description, the terms 'connected' and 'coupled' mean operationally connected and coupled. It should be appreciated that there may be any number of intervening components between the mentioned features, including no intervening components.

Figure 16:
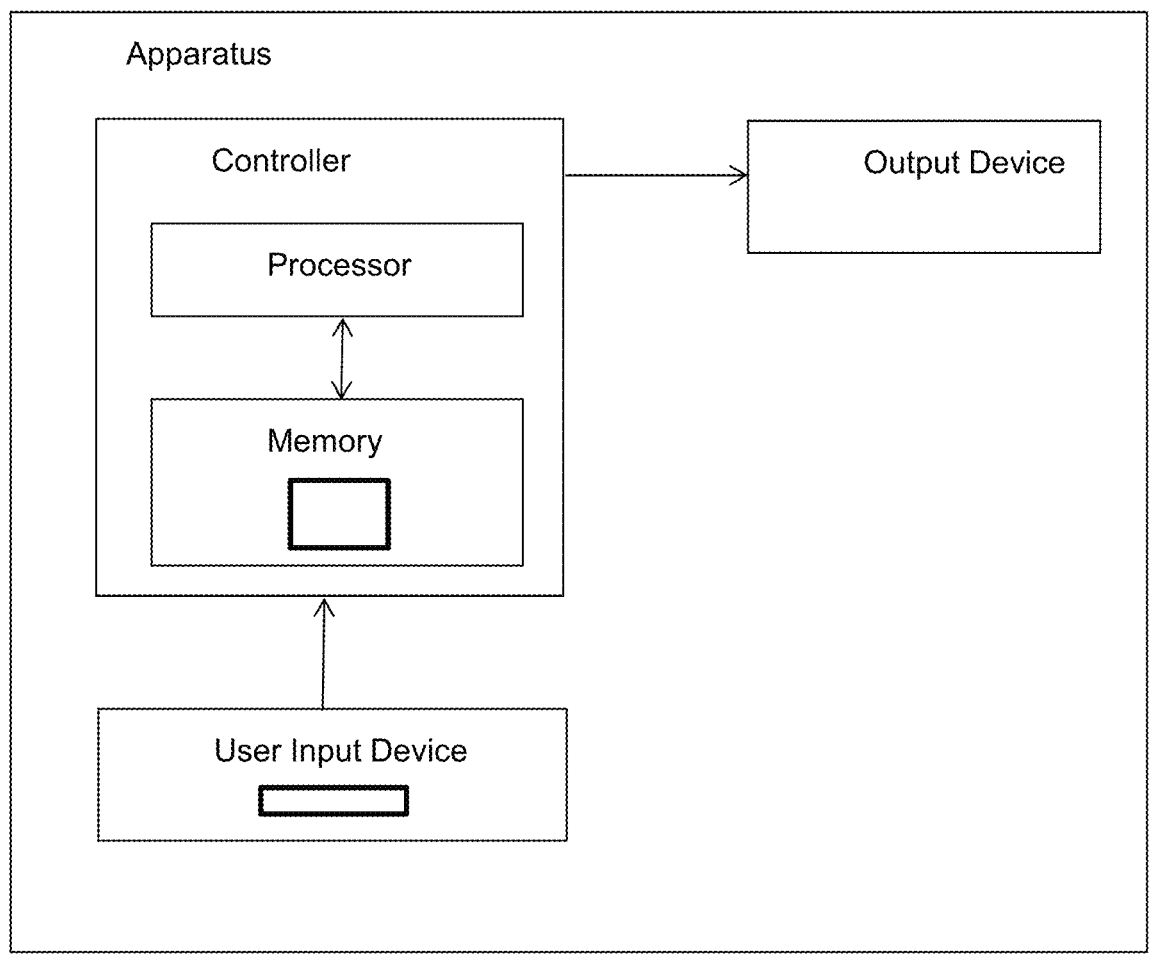
FIG. 16 illustrates a schematic diagram of an apparatus according to various examples.

It will be appreciated that identifying the performance sensitive areas of a component according to the invention is computationally intensive and preferably executed with the aid of a suitable computer. FIG. 16 illustrates a schematic diagram of an apparatus according to various examples. The apparatus includes a processor, a user input device, and an output device.

The processor, the user input device, and the output device may be coupled to one another via a wireless link and may consequently comprise transceiver circuitry and one or more antennas. Additionally or alternatively, the processing unit, the user input device and the output device may be coupled to one another via a wired link and may consequently comprise interface circuitry (such as a Universal Serial Bus (USB) socket). It should be appreciated that the processing unit, the user input device, and the output device may be coupled to one another via any combination of wired and wireless links.

The processing may comprise any suitable circuitry to cause performance of the methods described herein. The processing unit may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the processing unit may comprise at least one processor and at least one memory. The memory stores a computer program comprising computer readable instructions that, when read by the processor, causes performance of the methods described herein. The computer program may be software or firmware, or may be a combination of software and firmware. The processor may include at least one microprocessor and may comprise a single core processor, may comprise multiple processor cores (such as a dual core processor or a quad core processor), or may comprise a plurality of processors (at least one of which may comprise multiple processor cores).

The memory may be collocated with the other elements of the processing unit or may be located remotely. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The computer program may be stored on a non-transitory computer readable storage medium. The computer program may be transferred from the non-transitory computer readable storage medium to the memory. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory via a wireless signal or via a wired signal.

Input/output devices may be coupled to the system either directly or through intervening input/output controllers. Various communication adaptors may also be coupled to the controller to enable the apparatus to become coupled to other apparatus or remote printers or storage devices through intervening private or public networks. Non-limiting examples include modems and network adaptors of such communication adaptors.

The user input device may comprise any suitable device for enabling an operator to at least partially control the apparatus. For example, the user input device may comprise one or more of a keyboard, a keypad, a touchpad, a touchscreen display, and a computer mouse. The controller is configured to receive signals from the user input device.

The output device may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller is arranged to provide a signal to the output device to cause the output device to convey information to the user.

It should be appreciated that the methods described above may be performed 'offline' on data which has been measured and recorded previously. Alternatively it may be performed in 'real-time', that is, substantially at the same time that the data is measured.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

The invention claimed is:

1. A method of manufacturing a component having an in use gas washed surface, the method comprising:
   a) obtaining a reference component having a reference shape with an in use gas washed surface;
   b) setting one or more performance thresholds for the reference shape, the one or more performance thresholds defining an acceptable performance for the reference shape;
   c) obtaining a manufactured component made to the reference shape;
   d) measuring the manufactured component and determining a displacement distribution indicative of a geometric deviation of the manufactured component from the reference shape;
   e) determining a performance sensitivity distribution for the reference component, the performance sensitivity distribution having a plurality of points, each point being indicative of a performance factor for the reference component, the performance factor being a parameter that measures aerodynamic efficiency, isentropic efficiency, polytrophic efficiency, or an amount of flow over a part of a gas turbine engine including the gas washed surface;
   f) combining the performance sensitivity distribution and the displacement distribution to determine a performance prediction for the manufactured component;
   g) determining whether the performance prediction is within the one or more performance thresholds;
   h) accepting the manufactured component for use upon the performance prediction being within the one or more performance thresholds; and
   i) rejecting the manufactured component upon the performance prediction being outside the one or more performance thresholds.

2. The method as claimed in claim 1, further comprising:
setting one or more geometric thresholds for the reference shape, the one or more geometric thresholds being indicative of an acceptable geometric variance from the reference shape;
prior to step g), determining whether the displacement distribution includes one or more areas outside of the one or more geometric thresholds; and
when the displacement distribution includes one or more areas outside of the one or more geometric thresholds, carrying out step g), or accepting the manufactured component for use when the displacement distribution is within the one or more geometric thresholds.

3. The method as claimed in claim 2, wherein the one or more geometric thresholds are defined by an upper limit and a lower limit.

4. The method as claimed in claim 2, wherein the one or more geometric thresholds are provided at a constant distance around the reference component.

5. The method as claimed in claim 2, in which the reference component includes a plurality of zones, each zone of the plurality of zones having a different geometric threshold.

6. The method as in claimed in claim 5, in wherein the geometric threshold in each zone is determined in relation to a performance sensitivity for the reference component at each zone.

7. The method as claimed in claim 5, wherein the reference component includes an aerofoil portion and the at least one of the zones includes a leading edge, trailing edge or suction surface mid-chord region.

8. The method as claimed in claim 2, wherein the performance factor ($F_i$) for the parameter ($Objective_i$) is given by:

$$F_i(\vec{x}) = \frac{d\,Objective_i(\vec{x})}{d\vec{x}}$$

in which $\vec{x}$ is a spatial vector position of a surface relative to a reference component surface, and the performance factor is also one or more parameters from the group comprising: flow level, flow capacity, specific work, degree of reaction, and aerodynamic loss of the reference component.

9. The method as claimed in claim 2, wherein the combination of the performance sensitivity distribution and the displacement distribution is given by $$\Delta F_i = \sum_{j=1}^{N_{points}} F_i(\vec{x}_j) \cdot \Delta \vec{n}(\vec{x}_j),\text{ or}$$

$$\Delta F_i = \int_{Surface} F_i(\vec{x}_j) \cdot \Delta \vec{n}(\vec{x}_j)\,dA$$

in which $\Delta F_i$ is an effect on performance $F_i$ of a spatial geometry of the reference component, $\Delta \vec{n}(\vec{x}_i)$ is the displacement distribution and $N_{points}$ is a number of points analysed on the manufactured component.

10. The method as claimed in claim 1, wherein the performance factor ($F_i$) for the parameter ($Objective_i$) is given by:

$$F_i(\vec{x}) = \frac{d\,Objective_i(\vec{x})}{d\vec{x}}$$

in which $\vec{x}$ is a spatial vector position of a surface relative to a reference component surface.

11. The method as claimed in claim 1, wherein the performance factor is also one or more parameters from the group comprising: flow level, flow capacity, specific work, degree of reaction, and aerodynamic loss of the reference component.

12. The method as claimed in claim 1, wherein the combination of the performance sensitivity distribution and the displacement distribution is given by $$\Delta F_i = \sum_{j=1}^{N_{points}} F_i(\vec{x}_j) \cdot \Delta \vec{n}(\vec{x}_j),\text{ or}$$

$$\Delta F_i = \int_{Surface} F_i(\vec{x}_j) \cdot \Delta \vec{n}(\vec{x}_j)\,dA$$

in which $\Delta F_i$ is an effect on performance $F_i$ of a spatial geometry of the reference component, $\Delta \vec{n}(\vec{x}_j)$ is the displacement distribution and $N_{points}$ is a number of points analysed on the manufactured component.

13. The method as claimed in claim 1, wherein step d) includes discretely measuring geometric displacements at predetermined locations on the manufactured component in which the predetermined locations correspond to the plurality of points at which the performance sensitivity distribution is calculated.

14. The method as claimed in claim 1, wherein measuring the manufactured component includes measuring a surface of the manufactured component using a coordinate measuring machine.

15. The method as claimed in claim 1, wherein the measuring of the manufactured component includes scanning the manufactured component with an optical scanner.

16. The method as claimed in claim 1, further comprising:
   obtaining a plurality of manufactured components;
   determining the performance prediction for each of the plurality of manufactured components; and
   statistically averaging the performance predictions for the plurality of manufactured components to obtain a statistically averaged performance prediction,
   wherein determining whether the performance prediction is within the one or more performance thresholds is done using the statistically averaged performance prediction.

17. The method as claimed in claim 1, wherein the reference component includes an aerofoil portion.

18. The method as claimed in claim 17, wherein the aerofoil portion forms part of a turbine blade or turbine vane.

19. A non-transitory computer readable storage medium comprising computer readable instructions that, when read by a computer, cause performance of the method as claimed in claim 1.

* * * * *